US012576797B2

(12) United States Patent
Liu et al.

(10) Patent No.: US 12,576,797 B2
(45) Date of Patent: Mar. 17, 2026

(54) ROTATING DEVICE FOR DISPLAY OF VEHICLE

(71) Applicants: Hyundai Motor Company, Seoul (KR); Kia Motors Corporation

(72) Inventors: Yangyang Liu, Shandong (CN); Chao Liang, Shandong (CN); In Sik Chun, Seoul (KR); Min Wu, Shandong (CN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 18/808,910

(22) Filed: Aug. 19, 2024

(65) Prior Publication Data

US 2025/0162515 A1     May 22, 2025

(30) Foreign Application Priority Data

Nov. 22, 2023    (CN) .......................... 202311580162.2

(51) Int. Cl.
B60R 11/02         (2006.01)
B60K 35/22         (2024.01)
B60R 11/00         (2006.01)

(52) U.S. Cl.
CPC .......... B60R 11/0235 (2013.01); B60K 35/22 (2024.01); B60R 2011/0089 (2013.01)

(58) Field of Classification Search
CPC ...................................................... B60K 35/22
See application file for complete search history.

(56) References Cited

U.S. PATENT DOCUMENTS 11,235,710 B1 *   2/2022   Shumaker .......... F16M 11/2028
2004/0112165 A1 *  6/2004   Kinoshita .............. B62D 1/183
                                                   280/775

FOREIGN PATENT DOCUMENTS

| CN | 216611083 U | 5/2022 |
| JP | 2003-054322 A | 2/2003 |
| JP | 6397486 B2 | 9/2018 |
| KR | 10-0723296 | 5/2007 |

* cited by examiner

*Primary Examiner* — Clifford Hilaire
(74) *Attorney, Agent, or Firm* — Fox Rothschild LLP

(57)                   ABSTRACT

A rotating device is used in a display of a vehicle, and includes: a tilting rotation assembly and a horizontal rotation assembly, in which the display is fixed to the tilting rotation assembly, the tilting rotation assembly is mounted on an upper portion of the horizontal rotation assembly, and the display is tilted through the tilting rotation assembly, and horizontally rotated through the horizontal rotation assembly.

18 Claims, 16 Drawing Sheets

ROTATING DEVICE FOR DISPLAY OF VEHICLE

CROSS-REFERENCE TO RELATED APPLICATION

This application claims under 35 U.S.C. § 119(a) the benefit of Chinese Patent Application No. 202311580162.2 filed in the Chinese National Intellectual Property Administration on Nov. 22, 2023, the entire contents of which are incorporated herein by reference.

BACKGROUND

(a) Technical Field

The present disclosure relates to a rotating device used in a display of a vehicle.

(b) Description of the Related Art

In general, a vehicle is equipped with a display for displaying certain information to a driver. Since most vehicle displays are fixed at a specific angle, a reflection problem may occur in the display under various lighting conditions. In addition, a fixed mounting method cannot meet the needs for drivers of different heights and seating postures to adjust a display angle.

To this end, the prior art provides a mounting structure for a vehicle display. The mounting structure slides along an arc-shaped guide chute through a slider to move a central control display in an arc shape, thereby implementing a tilting angle and a height change, and then is fixed by a position fixation means, such that a reflection angle of light is changed to be applied to an eye requirement of the driver having a different height.

In such the mounting structure, only the tilting angle of the display may be adjustable but the display cannot be rotated between a left direction and a right direction, so if light outside the vehicle is irradiated to the display, the reflection of the display may not be avoided by changing the left and right direction of the display.

In addition, the display rotation technology of the related art may not be suitable for mass production, and a display connection structure, wiring harness arrangement, an actual vehicle assembly structure and an effective locking structure design are inadequate.

Therefore, a problem in the related art is how to adjust the left and right directions of the display.

The above information disclosed in this Background section is only for enhancement of understanding of the background of the disclosure, and therefore it may contain information that does not form the prior art that is already known in this country to a person of ordinary skill in the art.

SUMMARY

In order to solve the technical problem, the present disclosure provides a rotating device used in a display of a vehicle, in which the rotating device is configured to adjust tilting and horizontal left and right directions of the display.

The rotating device of the display for the vehicle according to the present disclosure may facilitate manipulation by a user so as to improve a visual experience.

The rotating device of the display for the vehicle according to the present disclosure may effectively lock a rotating structure and be useful in actual vehicle applications while meeting mass production standards.

An exemplary embodiment of the present disclosure provides a rotating device used in a display of a vehicle, which may include: a tilting rotation assembly and a horizontal rotation assembly, in which the display is fixed to the tilting rotation assembly, the tilting rotation assembly is mounted on an upper portion of the horizontal rotation assembly, and the display is tilted through the tilting rotation assembly, and horizontally rotated through the horizontal rotation assembly.

The tilting rotation assembly may include a position limitation shaft and a support frame, the position limitation shaft is mounted on the horizontal rotation assembly and extended in a vertical direction, and the support frame is rotatably mounted on the horizontal rotation assembly and the display is fixedly mounted on the support frame.

The support frame may include a position limitation groove and the position limitation shaft penetrates the position limitation groove.

The tilting rotation assembly may further include a position limitation sawtooth block, a button, and a spring, an arc-shaped rack may be provided in the support frame, the position limitation sawtooth block may be mounted on the position limitation shaft and have a sawtooth to be engaged with the arc-shaped rack, the spring may be mounted on the position limitation shaft and apply elastic force to engage the sawtooth of the position limitation sawtooth block and the arc-shaped rack with each other, and the button may be movably mounted on the position limitation shaft and penetrate the position limitation groove, and the button may allow the position limitation sawtooth block to be disengaged from the arc-shaped rack while overcoming the elastic force of the spring by applied actuation force.

The arc-shaped rack may be positioned on a lower surface of the support frame, the position limitation sawtooth block may be positioned below the arc-shaped rack, and the spring may be positioned below the position limitation sawtooth block, and the position limitation sawtooth block may be engaged with the arc-shaped rack through the elastic force of the spring and disengaged from the arc-shaped rack while overcoming the elastic force of the spring through downward pressure applied to the button by a user.

The support frame may be hinged to the horizontal rotation assembly through a hinge shaft, and a circular center of the arc-shaped rack of the support frame may be the hinge shaft and a distance from the arc-shaped rack to the hinge shaft may be a radius.

The support frame may be a U-shaped structure in which an opening faces the outside, the display may be mounted on one end of the opening of the support frame, the support frame may be constituted by a gear plate and a connection plate fixedly connected to each other, and the gear plate is positioned at an upper portion and the connection plate is positioned at a lower portion.

The arc-shaped rack may be provided on a lower surface of the gear plate, and a middle portion of the connection plate may be hinged to the horizontal rotation assembly through the hinge shaft.

The tilting rotation assembly may adjust a tilting angle of the display, an adjustment range of the tilting angle may be about +2° to −20°, and a sawtooth interval of the arc-shaped rack may be about 2°.

The tilting rotation assembly may further include a position limitation baffle, and the position limitation baffle may be mounted on each of both sides of the arc-shaped rack of the support frame to cover the position limitation sawtooth block and the arc-shaped rack.

The button cap is installed on the button.

The horizontal rotation assembly may include a steering seat, an upper cover, and a lower cover, and the upper cover and the lower cover may be coupled to each other to form one housing, an accommodation space may be provided in the housing, the steering seat may be disposed in the accommodation space and enabled to rotate with respect to the housing, and the support frame may be rotatably mounted on the steering seat.

The steering seat may include a bottom plate positioned at a lower portion and a boss positioned on the bottom plate, and the bottom plate and the boss may be an integrated structure.

A circular opening hole may be formed in the upper cover, and the boss is circular and be mounted in the circular opening hole.

A support seat may be installed above the boss, the support seat may have a support seat hole opened up, and the position limitation shaft may be inserted and fixed into the support seat hole.

Two lugs may protrude upwards at both sides of the support seat, a hinge shaft hole may be horizontally formed in each lug, and the hinge shaft may hinge the lower portion of the support frame to the lug through the hinge shaft hole.

The horizontal rotation assembly may further include a ball assembly, a first concave groove may be installed in one of the steering seat and the upper cover, a second concave groove may be installed in the other one of the steering seat and the upper cover, and the ball assembly may be mounted on the first concave groove.

A plurality of concave grooves may be provided, which is formed along an arc shape around a rotation center at a first predetermined interval, and the number of second concave grooves may be larger than the number of first concave grooves, and the second concave grooves may be disposed with the same radian as the first concave grooves at a second predetermined interval.

The first predetermined interval may be integer times the second predetermined interval.

The ball assembly may include a ball, a spring, and a screw plug, the screw plug may be inserted into the first concave groove, the spring may be installed at an upper portion of the screw plug, and the ball may be mounted on an upper portion of the spring.

A gear lever may be provided in one of the upper cover and the steering seat, and an arc groove may be formed in the other one of the upper cover and the steering seat.

The horizontal rotation assembly may adjust horizontal rotation of the display, and the adjustment range of the horizontal rotation angle is about −27° to +27°.

The sawtooth interval of the first concave groove may be about 2°.

The rotating device may further include: an external housing and a bracket, and the external housing may be mounted outside the tilting rotation assembly and the horizontal rotation assembly, and the bracket may be mounted on the external housing to connect and fixe the external housing and a vehicle dashboard.

A vehicle may include the above-described rotating device.

The beneficial effects of the rotating device used in the display for the vehicle according to the present disclosure include the following:

1. By effectively improving the reflection problem of the display under various lighting conditions, a comfortable manipulation and visual experience are provided to drivers and passengers with different heights and postures.

2. A theater mode is provided to provide a better visual experience to a driver and a passenger lying in a seat.

3. When a user does not adjust a rotating structure, the rotating structure of the present disclosure can be effectively locked.

4. Actual vehicle applications and mass production standards are satisfied.

The device of the present disclosure has other characteristics and advantages, and these characteristics and advantages will be apparent from the drawings attached to the specification and the exemplary embodiments to be described below, or described in detail in the drawings attached to the specification and the following exemplary embodiments, or in the drawings attached to the text and the exemplary embodiments to be described below, and both the drawings and the exemplary embodiments are intended to interpret the specific principle of the present disclosure.

BRIEF DESCRIPTION OF THE DRAWINGS

FIG. 8 is a schematic view illustrating a steering seat of a horizontal rotation assembly.

FIGS. 11A to 11F are schematic views illustrating different adjustment states of the rotating device according to an exemplary embodiment of the present disclosure, in which:

FIG. 11A illustrates a state in which the rotating device is at an initial position;

FIG. 11B illustrates a state in which a tilting rotation assembly rotates upward by an angle of +2°;

FIG. 11C illustrates a state in which a tilting rotation assembly rotates downward by an angle of −20°;

FIG. 11D illustrates a state in which a horizontal rotation assembly rotates horizontally to the right by an angle of +27°;

FIG. 11E illustrates a state in which a horizontal rotation assembly rotates horizontally to the left by an angle of −27°; and FIG. 11F illustrates a state in which the rotating device rotates in a space (that is, rotates upward and in the right at the same time).

Unless there is a separate explanation, the same reference numerals or symbols in the drawing refer to the same element.

Figure 1:
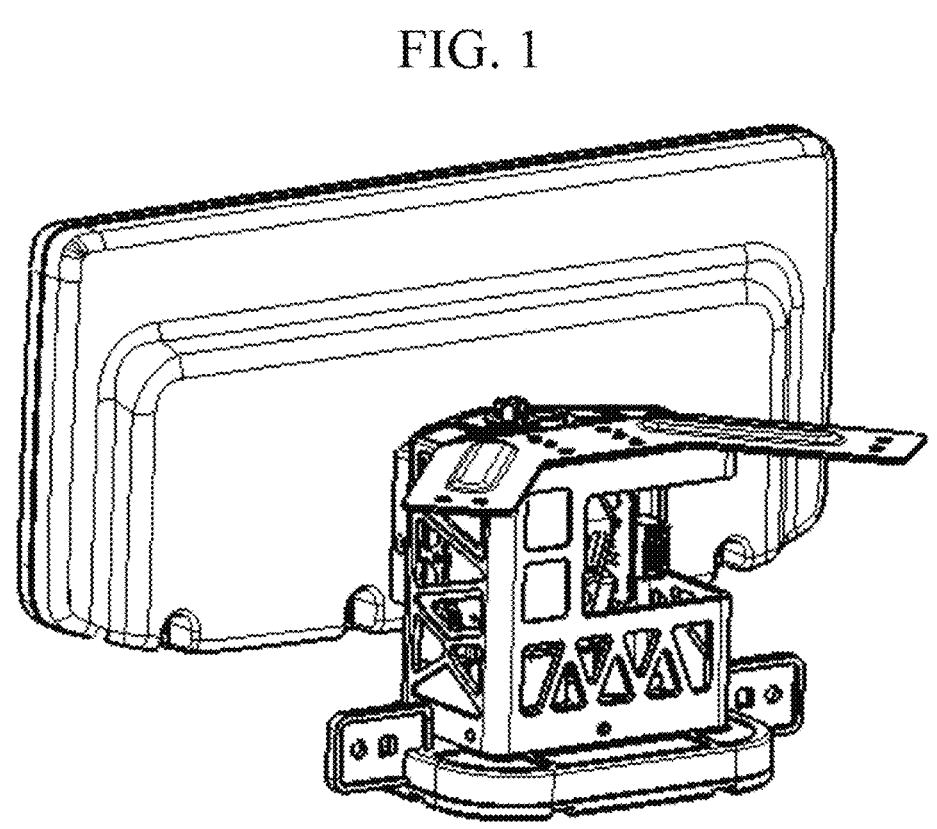
FIG. 1 is an overall schematic view of a rotating device used in a display of a vehicle according to an exemplary embodiment of the present disclosure, on which the display is mounted.

It should be understood that the referenced drawings are not particularly illustrated according to a scale, present a brief expression of various preferred features illustrating a basic principle of the present disclosure. For example, specific design features of the present disclosure, which include a specific dimension, a specific direction, a specific position, and a specific shape will be partially determined according to a specific intended application and a specific use environment.

In these drawings, the same reference numeral throughout a plurality of drawings represents the same or equal part of the present disclosure.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, each exemplary embodiment of the present disclosure will be referenced and will be described later by illustrating the exemplary embodiments in the drawing. Although the present disclosure is described in combination with an exemplary embodiment, it should be understood that the present disclosure is not intended to be limited to such an exemplary embodiment. On the contrary, the present disclosure includes not only the exemplary embodiments, but also includes a variety of selection formats, modification formats, equivalent formats and other exemplary embodiments in a limited scope of the spirit of the present disclosure and the limited scope of appended claims.

Hereinafter, a rotating device used in a display of a vehicle according to an exemplary embodiment of the present disclosure will be described in detail with reference to FIGS. 1 to 11F.

The rotating device used in the display of the vehicle according to an exemplary embodiment of the present disclosure may include a tilting rotation assembly S, a horizontal rotation assembly B, and other components.

The display may be fixed to the tilting rotation assembly A. the tilting rotation assembly A may be mounted on an upper portion of the horizontal rotation assembly B, and the display may be rotated to be tilted through the tilting rotation assembly A and horizontally rotated through the horizontal rotation assembly B. As described above, the rotating device is an adjusting device that manually adjusts an angle of the display of the vehicle.

First, a specific structure of the tilting rotation assembly A will be described with reference to FIGS. 2 to 6, and 10.

Figure 4:
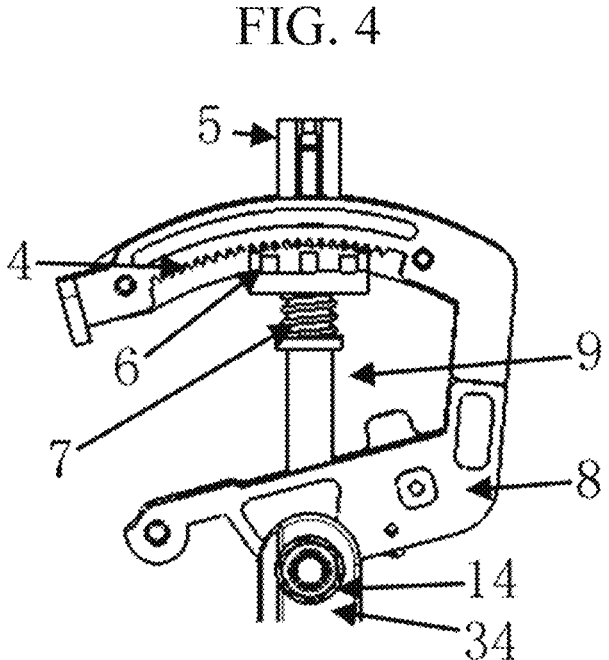
FIG. 4 is a schematic view of a tilting rotation assembly of the rotating device according to an exemplary embodiment of the present disclosure.

Referring to FIG. 4, the tilting rotation assembly A includes a position limitation shaft 9, a support frame, a button 5, a position limitation sawtooth block 6, a spring 7, and a hinge shaft 14.

The position limitation shaft 9 is a lever-shaped component mounted in upper and lower directions. A lower end of the position limitation shaft 9 is fixedly mounted on the horizontal rotation assembly B.

In the exemplary embodiment, the support frame 4 and 8 is a U-shaped structure in which an opening faces the outside. The display may be mounted on one end (a left end of the support frame in FIG. 4) of the opening of the support frame, and the display may conduct tilting adjustment as the support frame rotates. The support frame is constituted by a gear plate 4 and a connection plate 8 which are fixedly connected to each other. The gear plate 4 is positioned at an upper position and the connection plate 8 is positioned at a lower portion. For example, the gear plate 4 and the connection plate 8 are integrally formed. When the tilting rotation assembly A rotates, the support frame rotates the display to be tilted with respect to the position limitation shaft 9.

Figure 2:
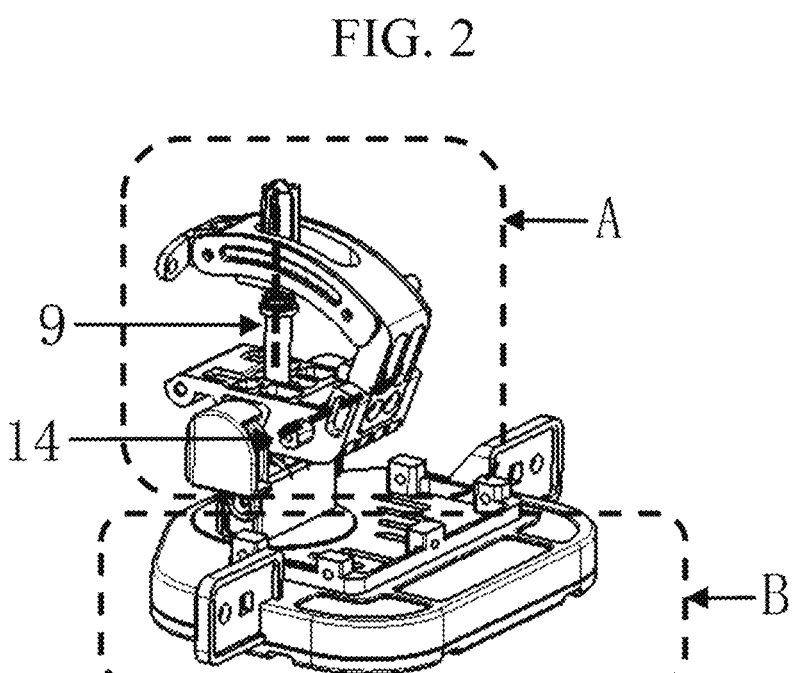
FIG. 2 is a schematic view of the rotating device according to an exemplary embodiment of the present disclosure.
Figure 6:
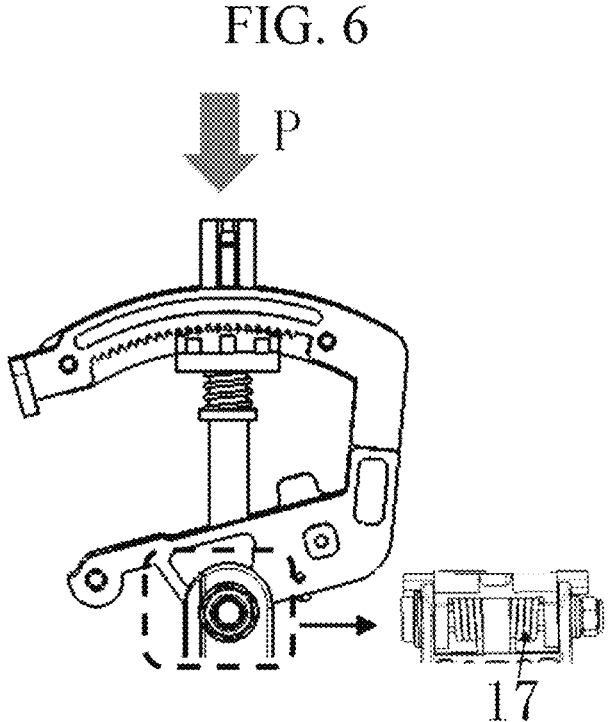
FIG. 6 is a schematic view illustrating a torsion spring of a tilting rotation assembly.

Referring to FIGS. 2, 4, and 6, a middle portion of the connection plate 8 is hinged to a lug 34 (see FIGS. 3 and 8) of a steering seat 18 of the horizontal rotation assembly B through the hinge shaft 14 to allow the tilting rotation assembly A to tilt around the hinge shaft 14. In the exemplary embodiment, a protrusion is provided at the middle portion of the connection plate 8, a through-hole is formed at the protrusion in a horizontal direction, and the hinge shaft 14 penetrates through the through-hole.

Figure 5:
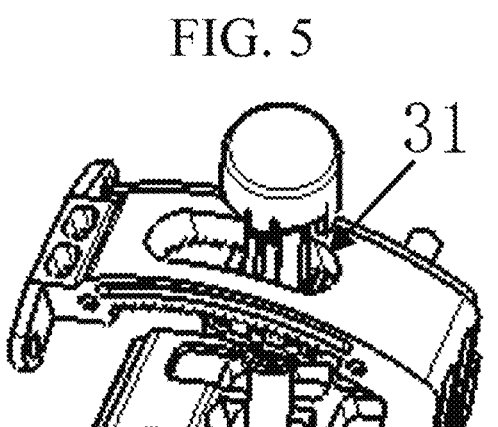
FIG. 5 is a schematic view of a tilting rotation assembly viewed from the top.

Referring to FIG. 5, a position limitation groove 31 is further formed in the gear plate 4 of the support frame, and the position limitation groove 31 penetrates through the gear plate 4 in the upper and lower directions and extends in a longitudinal direction of the gear plate 4. The position limitation shaft 9 penetrates the position limitation groove 31. A length of the position limitation groove 31 may be set according to an angle within which the display can be adjusted. That is, the angle within which the display can be adjusted when the button 5 is at an end of the position limitation groove 31 corresponds to a threshold angle.

Referring back to FIG. 4, an arc-shaped rack is formed between a front end and a rear end (a left end and a right end of the gear plate 4 in FIG. 4) of the gear plate 4 of the support frame. A circular center of the arc-shaped rack is the hinge shaft 14 and a distance from the arc-shaped rack to the hinge shaft 14 is a circular radius.

The arc-shaped rack is provided on a bottom of the gear plate 4 of the support frame and positioned at both sides of the position limitation groove 31, and a sawtooth portion is formed downwards. A length of the arc-shaped rack corresponds to the length of the position limitation groove 31. For example, the length of the arc-shaped rack may be larger than the length of the position limitation groove 31.

A position limitation sawtooth block 6 is used for controlling a dynamic stroke and the angle of the display. The position limitation sawtooth block 6 is provided on the position limitation shaft 9 and positioned below the gear plate 4 of the support frame, and a sawtooth surface is formed upwards and engaged with the arc-shaped rack of the gear plate 4 of the support frame.

The spring 7 is positioned below the position limitation sawtooth block 6 and applies upward elastic force to the position limitation sawtooth block 6 to control movement of the position limitation sawtooth block 6, thereby preventing the position limitation sawtooth block 6 from being disengaged from an engagement position in a locking state.

A flange is provided on the position limitation shaft 9 below the spring 7. A lower end of the spring 7 is in contact with the flange and an upper end of the spring 7 is in contact with a lower surface of the position limitation sawtooth block 6 to apply the upward elastic force to the position limitation sawtooth block 6 and to press the position limitation sawtooth block 6 to the arc-shaped rack, so the position limitation sawtooth block 6 and the arc-shaped rack are engaged with each other.

The button 5 is used for controlling (rotating/locking) a tilting rotation function of the tilting rotation assembly. The button 5 is installed on a top of the position limitation shaft 9 and penetrates the position limitation groove 31. A hole is formed at a center of the button 5 such that the button 5 may be fitted and installed in the position limitation shaft 9 and moved up and down with respect to the position limitation shaft 9. A lower end of the button 5 is in contact with an upper surface of the position limitation sawtooth block 6. A user presses the button 5 in a P direction to move the position limitation sawtooth block 6 downward while overcoming the elastic force of the spring 7, so the contact of the position limitation sawtooth block 6 may be released from the arc-shaped rack. In this state, the user rotates the support frame in forward and backward directions to adjust the tilting angle of the display (i.e., an adjustment state). When the user releases the button 5, the position limitation sawtooth block 6 is moved upwards by the elastic force of the spring 7, which allows the support frame and the position limitation shaft 9 to be locked, thereby fixing the display (i.e., a locking state).

For example, a button cap is installed in the button 5. When the user presses the button 5, a pressure of a finger of the user may be reduced, and a finger pain of the user is not generated due to an excessive pressure.

Figure 3:
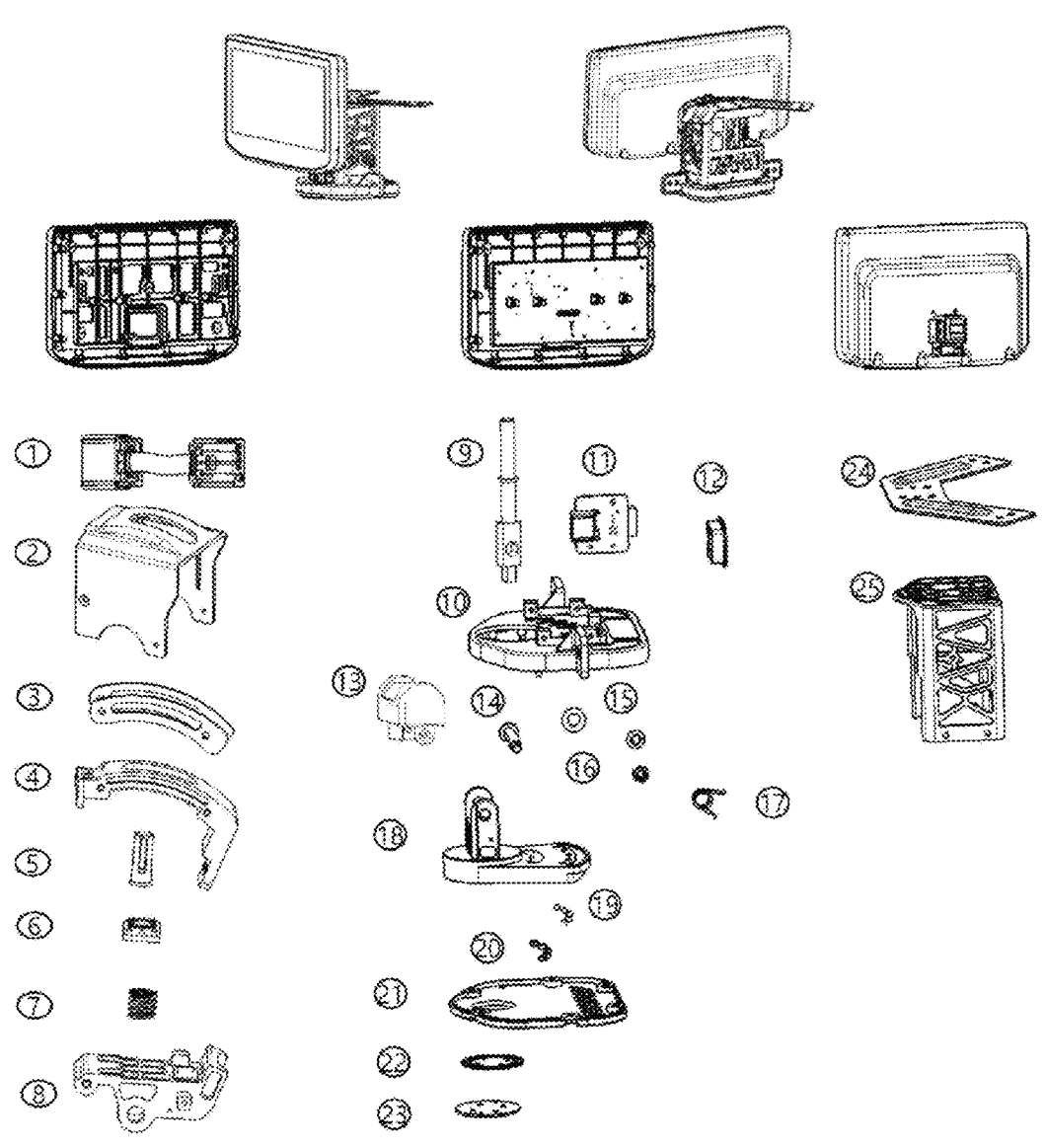
FIG. 3 is a schematic view illustrating members of the rotating device according to an exemplary embodiment of the present disclosure.
Figure 10:
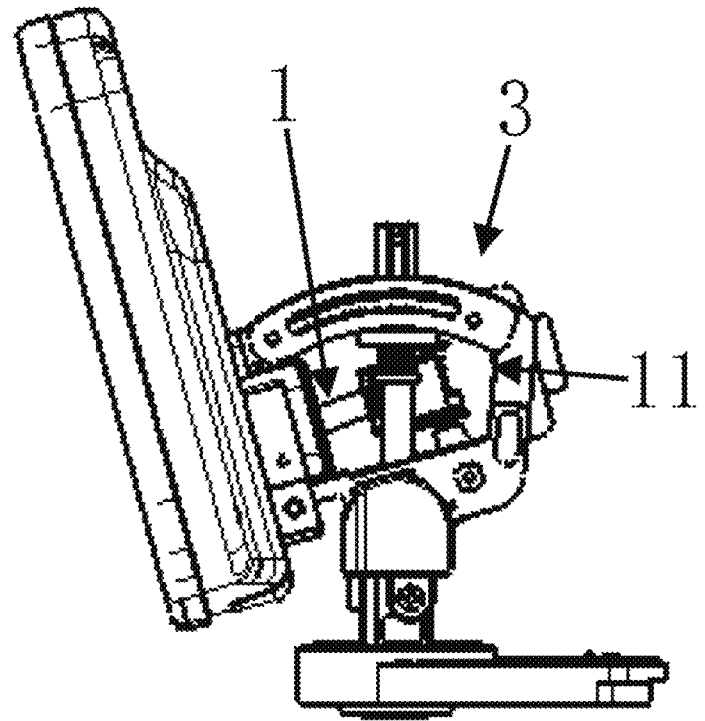
FIG. 10 is a side view of the rotating device according to an exemplary embodiment of the present disclosure.

Referring to FIGS. 3 and 10, the tilting rotation assembly A further includes a position limitation baffle 3 used for the gear plate 4 and the position limitation sawtooth block 6 to be engaged at an accurate position. Two position limitation baffles 3 are installed and mounted on both left and right sides of the arc-shaped rack of the gear plate 4 of the support frame to cover the position limitation sawtooth block 6 and the arc-shaped rack and ensure that the gear plate 4 and the position limitation sawtooth block 6 are engaged at the accurate position. In addition, the position limitation baffle 3 may prevent foreign substances from entering a gear and influencing engagement of the gears, and at the same time, ensure an external appearance of the tilting rotation assembly A nicely and neatly. Optionally, the position limitation baffle 3 may not be installed, which does not exert a large influence on the use of the tilting rotation assembly A.

In the exemplary embodiment, the position limitation sawtooth block 6 is provided below the arc-shaped rack and engaged with the arc-shaped rack through the elastic force of the spring 7, and when the tilting angle is adjusted, the button 5 is pressed to adjust the display angle. However, the tilting rotation assembly A may use another structure. For example, the arc-shaped rack is formed on an upper surface of the gear plate 4, the position limitation sawtooth block 6 is positioned above the gear plate 4, and the position limitation sawtooth block 6 is pressed down through the spring to allow the gear plate 4 and the arc-shaped rack to be engaged. The position limitation sawtooth block 6 is released from the support frame by pushing up the button 5 to adjust the angle of the display. Alternatively, the rack is formed at a side of the position limitation groove 31 of the gear plate 4 and the gear engaged with the rack is formed on an outer periphery of the button 5 so that the support frame is adjusted by rotating the button 5 in use.

The tilting angle of the display may be adjusted through the tilting rotation assembly A, and an adjustment range of the tilting angle is about +100 to −35°, and preferably, about 2° to −20°. Further, when a sawtooth interval of the arc-shaped rack is approximately 1° to 5°, and preferably is about 2°. If the sawtooth interval is 2°, the tilting angle may be adjusted by at least 2° (i.e., a radian corresponds to one sawtooth). The adjustment range of the tilting angle and the sawtooth interval may be changed according to actual needs.

In the present disclosure, the engagement of the gear of the tilting rotation assembly is controlled to implement the rotation in a tilting direction. When the position limitation sawtooth block 6 and the gear plate 4 are engaged, the tilting rotation assembly is locked to fix the display in the tilting direction. When the tilting adjustment of the display is required, the user disengages the position limitation sawtooth block 6 from the gear plate 4 by pressing the button 5, and then adjusts the angle of the display in the tilting direction.

Further, a wiring harness 1, a circuit board 11, and a wiring harness clamping sleeve 12 may be fixed to the tilting rotation assembly A. The wiring harness 1 is used for connecting a dashboard and a control host. The wiring harness clamping sleeve 12 is used for protecting the wiring harness not to be bent. Since the wiring harness 1 and the circuit board 11 are always fixed to the tilting rotation assembly, when a position of the wiring harness for the display is not changed and the horizontal rotation assembly horizontally rotates in the process of tilting the tilting rotation assembly, the entirety of the rotating device rotates horizontally. Therefore, the wiring harness 1 and the circuit board 11 may ensure to continuously supply power even when the display rotates.

Hereinafter, a specific structure of the horizontal rotation assembly B will be described with reference to FIGS. 2 to 3 and 6 to 9.

Referring to FIGS. 2 and 3, the horizontal rotation assembly B includes the steering seat 18, an upper cover 10, a lower cover 21, and a ball assembly.

The upper cover 10 and the lower cover 21 are coupled to each other and form one housing with an accommodation space, and the steering seat 18 is disposed in the accommodation space.

Figure 8:
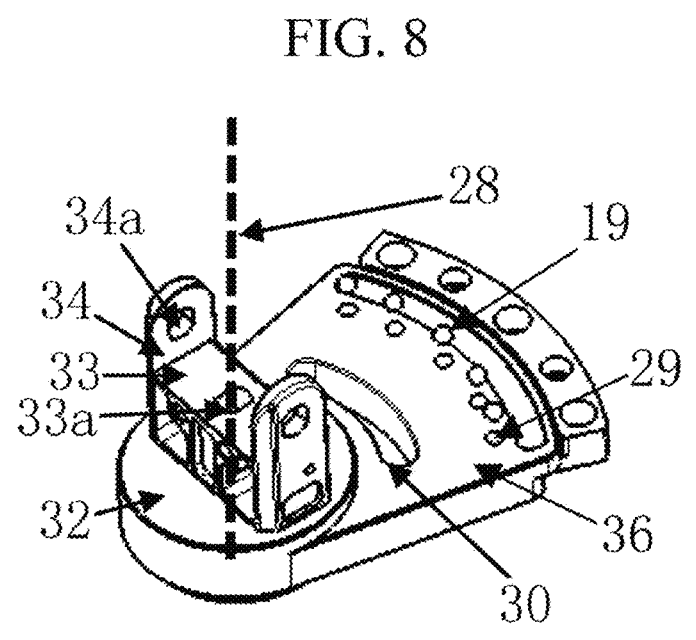

Referring to FIG. 8, the steering seat 18 includes a bottom plate 36 positioned at a lower portion and a boss 32 positioned above the bottom plate 36. The bottom plate 36 and the boss 32 are an integrated structure.

The bottom plate 36 is approximately fan-shaped. One end (outer end) of the bottom plate 36 is an arc surface and the other end (inner end) of the bottom plate 36 is a semi-circular shape.

A plurality of lower concave grooves 29 which are opened up is formed at one side of the bottom plate 36 and a circular boss 32 is provided at the other side of the bottom plate 36. An arc groove 30 is formed at a middle portion of the bottom plate 36. The plurality of lower concave grooves 29 and the arc groove 30 are formed or disposed in an arc shape with a center of the boss 32 as a circular center. The plurality of lower concave grooves 29 is formed at a fixed interval.

A ball assembly for limiting the position of the horizontal rotation assembly when the horizontal rotation assembly is in the locking state is provided in each lower concave groove 29.

Figure 9:
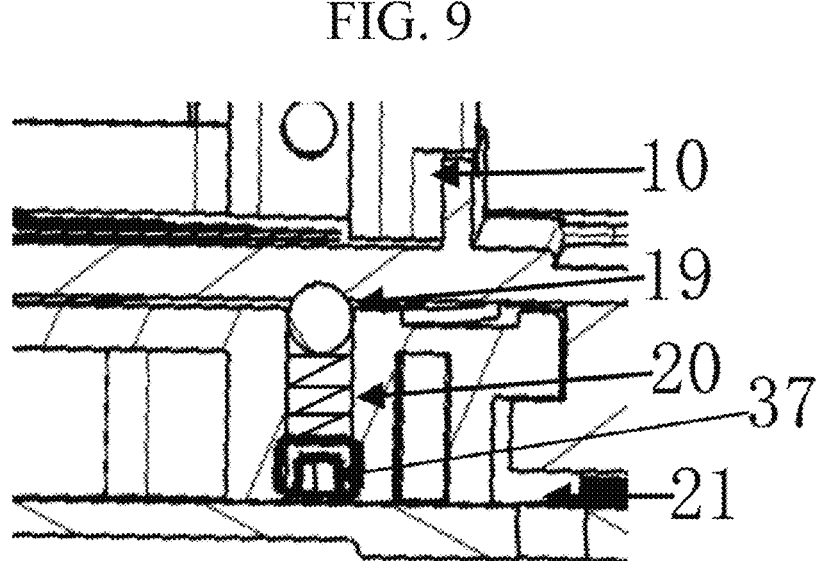
FIG. 9 is a schematic view illustrating a roll assembly of a horizontal rotation assembly.

Referring to FIG. 9, the ball assembly includes a ball 19, a spring 20, and a screw plug 37. The screw plug 37 is inserted into the lower concave groove 29, the spring 20 is mounted thereon, and the ball 19 is disposed on the spring 20. The ball 19 protrudes from the lower concave groove 29 under actuation of the spring 20. When external force is received, the ball 19 moves downwards and is inserted into the lower concave groove 29. A different compression amount of the spring 20 may be acquired through a tightening depth of the screw plug 37 such that when the horizontal rotation assembly B dynamically moves in a horizontal direction, the horizontal rotation assembly B has a different damping value. Further, a specification of the screw plug 37 supporting the spring 20 and the ball 19 is adjusted to adjust the external force required for rotation.

In the exemplary embodiment, five lower concave grooves 29 are formed on the bottom plate 36. However, those skilled in the art will understand that the number of lower concave grooves 29 may be adjusted as necessary, and for example, may be 1 to 12.

Referring back to FIG. 8, the boss 32 is circular and protrudes upwards from the other end (inner end) of a bottom surface. A support seat 33 is provided on the boss 32. A support seat hole 33a which is opened up is formed at a middle portion of the support seat 33, and the position limitation shaft 9 is inserted and fixed into the support seat hole 33a. Two lugs 34 protrude upwards at both sides of the support seat 33, a hinge shaft hole 34a is horizontally formed in each lug 34, and the hinge shaft 14 penetrates the hinge shaft holes 34a to hinge the lower portion of the support frame to the lug 34, so that the support frame may rotate with respect to the bottom plate 36.

Referring to FIGS. 3 and 6, a thread is formed at one end portion of the hinge shaft 14, and a gasket 15 and a locking nut 16 are mounted on the thread. The gasket 15 is used for preventing a fastening bolt from being released due to vibration upon vehicle driving, and the locking nut 16 provides damping when the tilting rotation assembly tilts.

The torsion spring 17 is further provided between the lug 34 and the support frame. The torsion spring 17 is fitted and installed into the hinge shaft 14 and both ends of the torsion spring 17 are supported by the lug 34 and the support frame, respectively. While the support frame rotates, the torsion spring 17 may provide relatively high dynamic stability which causes a damping effect to ensure the display not to rotate down abruptly due to a weight of the display when the position limitation sawtooth block 6 is disengaged from the arc-shaped rack. In other words, the torsion spring 17 provides a predetermined damping when the display moves downwards to prevent the display from falling down due to the weight of the display after the tilting rotation is unlocked.

Figure 7:
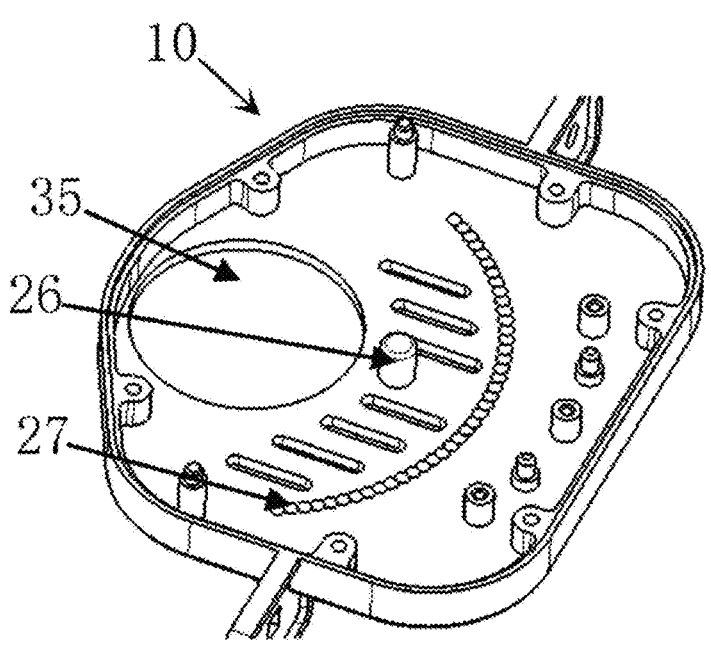
FIG. 7 is a schematic view illustrating an upper cover of a horizontal rotation assembly of the rotating device according to an exemplary embodiment of the present disclosure.

The upper cover 10 is mounted on the steering seat 18. Referring to FIG. 7, a circular opening hole 35 is formed at one end portion of the upper cover 10, and the circular boss 32 is fitted and installed into the opening hole 35. A size of the circular opening hole 35 corresponds to the size of the circular boss 32 so that the boss 32 may rotate in the opening hole 35.

A gear lever 26 is provided on the lower surface of the upper cover 10. The gear lever 26 protrudes downwards on the lower surface of the upper cover 10 and is inserted into the arc groove 30 of the steering seat 18 to serve to limit a rotation angle of the steering seat 18 with respect to the upper cover 10. In the exemplary embodiment, the gear lever 26 is cylindrical shape, but may be another shape without influencing the use thereof. In the exemplary embodiment, the gear lever is provided in the upper cover, and the arc groove is formed in the steering seat, but positions of the gear lever and the arc groove may also be replaced, that is, the gear lever is provided in the steering seat and the arc groove is formed in the upper cover.

A plurality of upper concave grooves 27 which is opened down is provided on the lower surface of the upper cover 10. The number of upper concave grooves 27 is larger than the number of lower concave grooves 29, and for example, the number of upper concave grooves 27 is 2 to 5 times the number of lower concave grooves 29. In the exemplary embodiment, the number of upper concave grooves 27 is 41. The upper concave grooves 27 are installed around the opening hole 35 at a fixed interval. Since the interval between two adjacent lower concave grooves 29 is integer multiple of the interval between two adjacent upper concave grooves 27, it is ensured that the ball 19 may be simultaneously inserted into the upper concave groove 27 and the lower concave groove 29. The interval between the adjacent upper concave grooves 27 determines a minimum rotation angle.

A radian of the upper concave groove 27 is longer than the radian of the lower concave groove 29, and a difference value therebetween is the rotation angle of the upper cover 10 with respect to the steering seat 18.

The horizontal rotation assembly B rotates in the left and right directions through the ball assembly. In the locking state, the ball 19 is fitted into the upper concave groove 27 and the lower concave groove 29. The ball 19 is inserted into the upper concave groove 27 of the upper cover 10 and the lower concave groove 29 of the steering seat 18 to implement horizontal locking of the horizontal rotation assembly B. The ball 19 gets out of the upper concave groove 27 of the upper cover 10 by applying the external force, so that the horizontal rotation assembly B rotates around a rotation center.

In the exemplary embodiment, the ball assembly is mounted on the lower concave groove 29, but the ball assembly may also be mounted on the upper concave groove. In this case, structures of the lower concave groove and the upper concave groove should be changed. That is, five (or different numbers) upper concave grooves are formed in the upper cover, the ball assembly is mounted on the upper concave groove, and 41 (or different numbers) lower concave grooves are formed in the steering seat.

The display may be rotated in the left and right directions through the horizontal rotation assembly B, and a range of the angle at which the display is rotated in the left and right directions may be about −27° to 27°. Further, the interval between the upper concave grooves 27 is about 1° to 5°, and preferably, is about 3°. When the interval is 3°, the horizontal rotation assembly B may adjust the horizontal rotation angle by at least 3° (that is, the horizontal rotation assembly B is rotated to the left direction or the right direction by a radian of one upper concave groove 27. The angle range in which the display rotates in the left and right directions, and the intervals between the concaves may also be changed according to actual needs.

A baffle 23 and a resin gasket 22 are installed in the horizontal rotation assembly B. When the steering seat 18 and the lower cover 21 are coupled, the baffle 23 is used for preventing the steering seat 18 and the lower cover 21 from being tilted with respect to each other. Further, since a machine processing surface may not be perfect, pressure is applied between the baffle 23 and the lower cover 21. In addition, since a coupling interval is changed upon natural thermal expansion and cold contraction, irregularity of coupling is complemented by using the resin gasket 22.

Referring to FIGS. 1 and 3, the rotating device used in the display of the vehicle according to an exemplary embodiment of the present disclosure further includes an external housing 25 and a bracket 24. The external housing 25 is mounted outside the tilting rotation assembly A and the horizontal rotation assembly B, and the bracket 24 is mounted on the external housing 25 to fix the external housing 25 to the vehicle dashboard. Additionally, the rotating device used in the display of the vehicle according to an exemplary embodiment of the present disclosure further includes a horizontal steering trim cover and a tilting rotation trim cover 13 for shielding an internal structures.

Hereinafter, manipulation of the rotating device used in the display of the vehicle according to an exemplary embodiment of the present disclosure will be described.

Figure 11A:
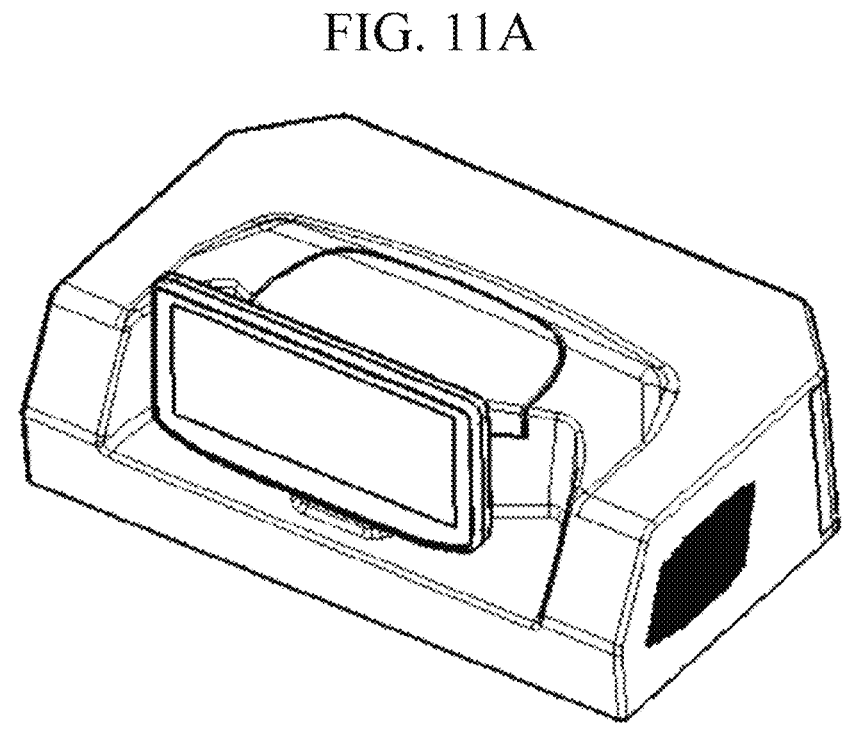
Figure 11B:
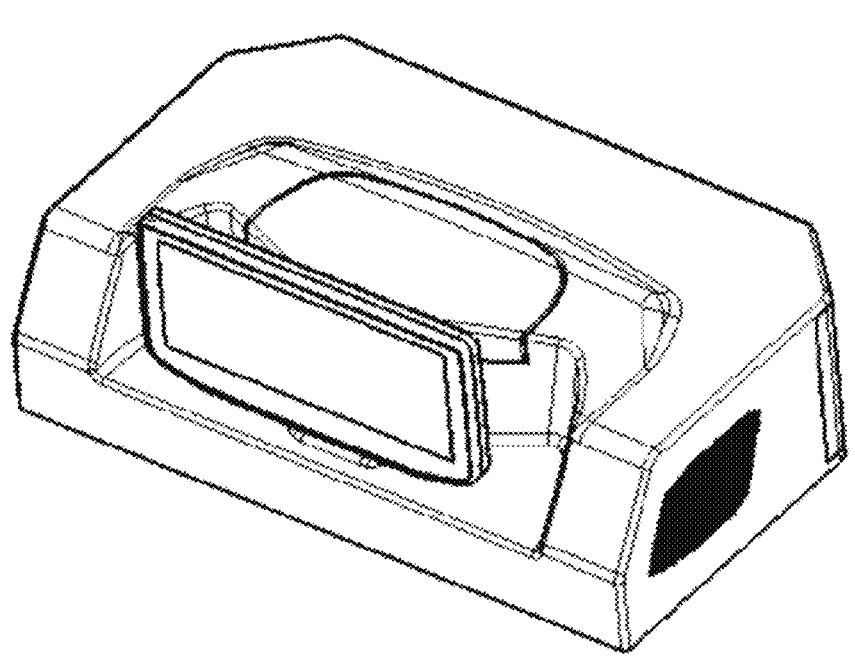
Figure 11C:
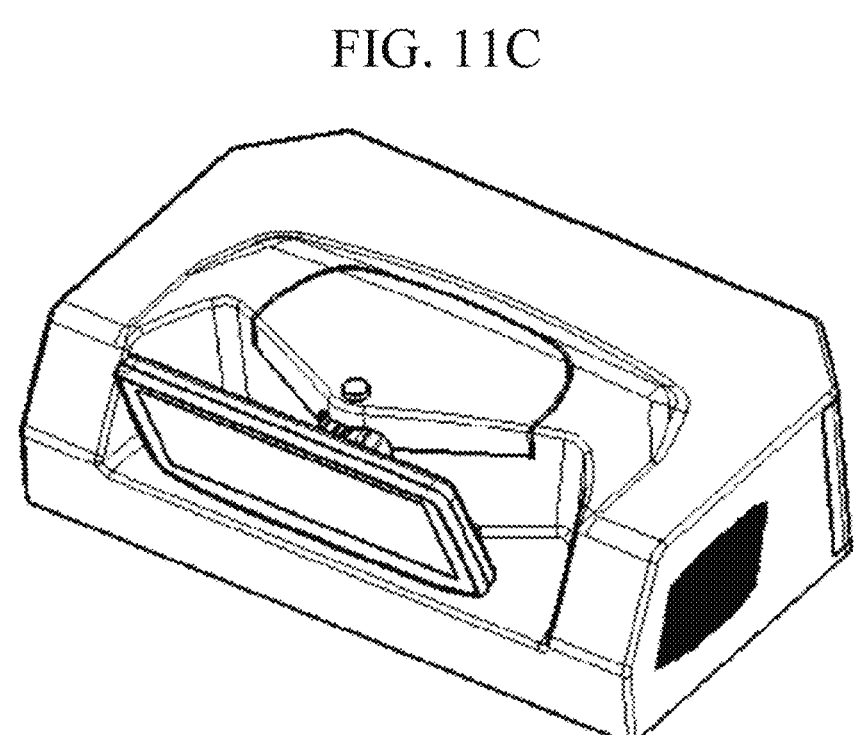

(I) The manipulation of the tilting rotation assembly will be described with reference to FIGS. 11A to 11C.

1. When the tilting rotation assembly is in the locking state, the spring 7 maintains a compressed state, and elastic force generated thereby allows the position limitation sawtooth block 6 to be engaged with the arc-shaped rack 4 to implement the locking of the tilting rotation assembly.
2. When the button 5 is pressed, the spring 7 is additionally compressed, so the position limitation sawtooth block 6 moves downwards vertically along the position limitation shaft 9, and the position limitation sawtooth block 6 is disengaged from the arc-shaped rack 4. In this case, as the user applies the external force, the arc-shaped rack 4 fixedly connected to the display and the connection plate 8 fixedly connected to the arc-shaped rack 4 tilt around the hinge shaft 14. At the same time, the torsion spring 17 ensures the display not to rotate downwards abruptly due to the weight of the display when the position limitation sawtooth block 6 is disengaged from the arc-shaped rack 4. The position limitation groove 31 on the arc-shaped rack 4 implements the tilting rotation angle of the tilting rotation assembly together with the position limitation shaft 9.

3. When the button 5 is released, the position limitation sawtooth block 6 moves upwards vertically along the position limitation shaft 9 by the elastic force of the spring 7 and is engaged with the arc-shaped rack 4 to implement the locking of the tilting rotation of the tilting rotation assembly.

Figure 11D:
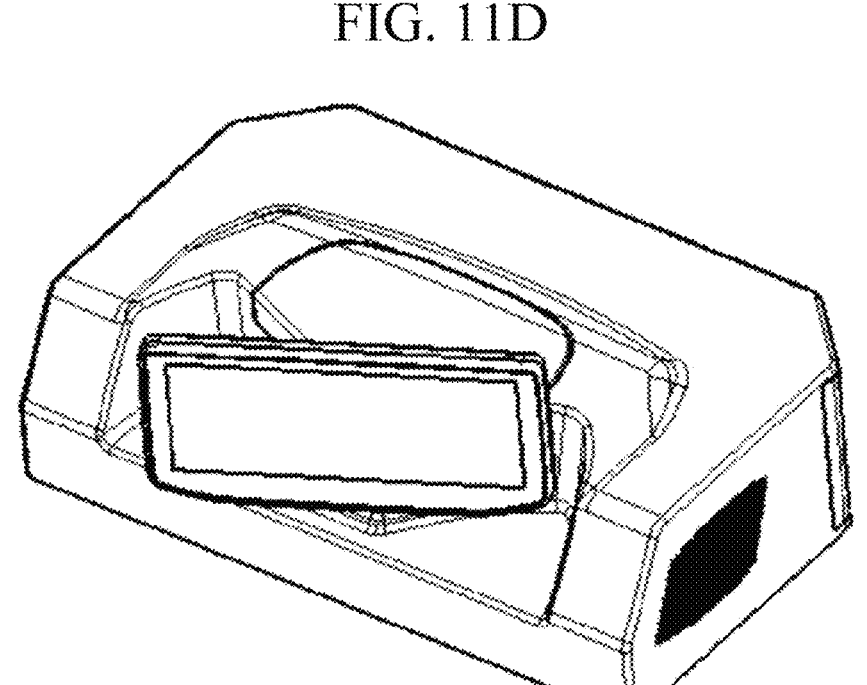
Figure 11E:
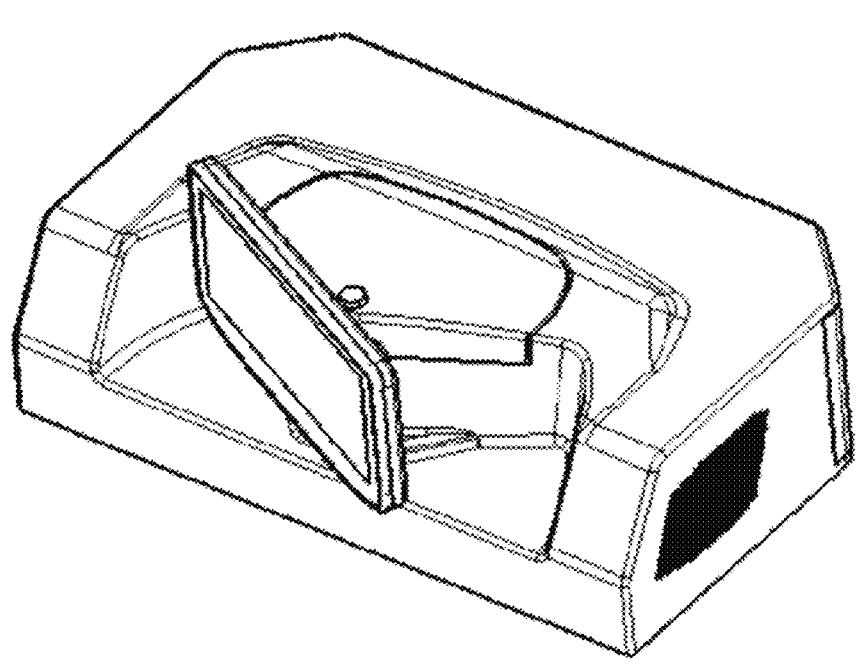
Figure 11F:
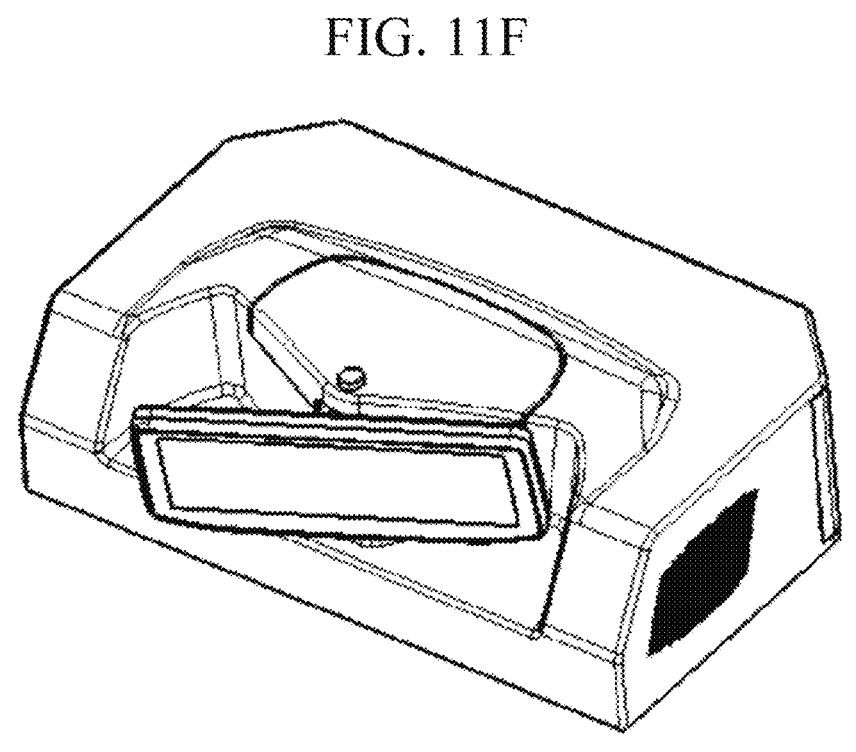

(II) The manipulation of the horizontal rotation assembly will be described with reference to FIGS. 11D to 11E.

1. The upper concave grooves 27 are evenly distributed in the upper cover 10, distances from the upper concave grooves 27 to the position limitation shaft 9 are all the same, and 5 cylindrical lower concave grooves 29 are evenly distributed in the steering seat 18. The upper concave groove 27 on the upper cover 10 pushes the ball 19 and the screw plug 37 into the cylindrical lower concave groove 29 of the steering seat 18, and a lower end of the screw plug 37 is in contact with the baffle 23.
2. When the horizontal rotation assembly is in a stop state, the spring 20 is continuously compressed, which allows the ball 19 to be inserted into the upper concave groove 27 on the upper cover 10, so that the display receives predetermined damping force and the rotation of the display around the position limitation shaft 9 is limited. When the rotational force applied to the display is larger than the damping force, the upper cover 10 rotates with respect to the steering seat 18. In this case, since the upper concave groove 27 on the upper cover 10 gradually pushes the ball 19 into a subsequent cylindrical lower concave groove 29 of the steering seat 18, the display rotates horizontally. The cylindrical gear lever 26 on the upper cover 10 limits the rotation angle of the horizontal rotation assembly together with the arc groove 30 on the steering seat 18.
3. The elastic force which the spring 20 applies to the ball 19 is adjusted by replacing a spring 20 having a different specification or adjusting the tightening depth of the screw plug 37 to adjust the damping force which applies to the display when horizontally rotating.
4. The rotating device used in the display of the vehicle according to an exemplary embodiment of the present disclosure also allows the display to be simultaneously adjusted in the tilting direction and the horizontal direction (see FIG. 11F) by manipulating the tilting rotation assembly A and the horizontal rotation assembly B.

In an exemplary embodiment of the present disclosure, a case where the display may rotate simultaneously around a horizontal axis and a vertical axis is set, and both rotation and locking assemblies corresponding to two rotation directions are designed, but the present disclosure is not only included in the exemplary embodiment, but may also include the following cases:

1. A display rotating device using only the tilting rotation assembly according to an exemplary embodiment of the present disclosure.
2. A display rotating device using only a horizontal rotation mechanism according to an exemplary embodiment of the present disclosure.
3. A display rotating device changing the rotation angle of the tilting rotation assembly or the rotation angle with respect to the horizontal rotation mechanism according to an exemplary embodiment of the present disclosure.

According to the present disclosure, multi-dimensional rotation of the display in tilting and in the left and right directions is implemented through the manual manipulation, so watching requirements of customers having different heights and postures are met, and mass production standards of actual vehicles are met. According to the present disclosure, the display angle is adjusted to effectively improve the reflection problem of the display under various lightings. Further, the present disclosure provides comfort manipulation and visual experience to drivers and passengers having different heights and postures.

Of course, those skilled in the art should understand that external appearances, materials, and number of structures according to the present disclosure can be changed without changing the concept of the present disclosure.

Additionally, an exemplary embodiment of the present disclosure may further include a lifting device to meet requirements of persons having different heights by increasing a height of the display. The lifting device may be installed below the horizontal rotation assembly B, for example.

The display rotation device according to an exemplary embodiment of the present disclosure is used in the display of the vehicle but can also be installed in other transportation means other than the vehicles such as ships and aircrafts.

Hereinabove, the description of the exemplary embodiment is just for describing the technique of the present disclosure and is neither for completely integrate the present disclosure nor for limiting the present disclosure to an exact form described. Of course, those skilled in the art can variously modified and change the present disclosure according to the above-described contents. The specific principles of the present disclosure and their actual application are analyzed, and otherwise understanding and implementing otherwise are easily understood and the exemplary embodiment is selected and described so as to use various exemplary embodiments of the present disclosure and various optional forms and modified forms. The scope of the present disclosure is limited by the appended claims and a form equivalent thereto.

What is claimed is:

1. A rotating device for a display of a vehicle, the rotating device comprising:

a tilting rotation assembly and a horizontal rotation assembly, wherein the display is fixed to the tilting rotation assembly, the tilting rotation assembly is mounted on the horizontal rotation assembly, and the display is tilted through the tilting rotation assembly and horizontally rotated through the horizontal rotation assembly, wherein the tilting rotation assembly includes a position limitation shaft, a support frame, and a position limitation sawtooth block, the position limitation shaft is mounted on the horizontal rotation assembly and extended in a vertical direction, and the support frame is rotatably mounted on the horizontal rotation assembly and the display is fixedly mounted on the support frame, wherein the support frame includes a position limitation groove, and the position limitation shaft penetrates the position limitation groove, wherein an arc-shaped rack is provided in the support frame; and the position limitation sawtooth block is mounted on the position limitation shaft and has a sawtooth to be engaged with the arc-shaped rack.

2. The rotating device of claim 1, wherein the tilting rotation assembly further includes a button, and a spring, wherein the spring is mounted on the position limitation shaft and applies elastic force to engage the sawtooth of the position limitation sawtooth block and the arc-shaped rack with each other, and the button is movably mounted on the position limitation shaft and penetrates the position limitation groove, and the button allows the position limitation sawtooth block to be disengaged from the arc-shaped rack while overcoming the elastic force of the spring by actuation force.

3. The rotating device of claim 2, wherein the arc-shaped rack is positioned on a lower surface of the support frame, the position limitation sawtooth block is positioned below the arc-shaped rack, and the spring is positioned below the position limitation sawtooth block, and the position limitation sawtooth block is engaged with the arc-shaped rack through the elastic force of the spring and disengaged from the arc-shaped rack while overcoming the elastic force of the spring through downward pressure applied to the button by a user.

4. The rotating device of claim 3, wherein the support frame is hinged to the horizontal rotation assembly through a hinge shaft, and a circular center of the arc-shaped rack of the support frame is the hinge shat.

5. The rotating device of claim 4, wherein the support frame is a U-shaped structure, the display is mounted on one end of the opening of the support frame, and the support frame is constituted by a gear plate and a connection plate fixedly connected to each other.

6. The rotating device of claim 5, wherein the arc-shaped rack is provided on the gear plate, and the connection plate is hinged to the horizontal rotation assembly through the hinge shaft.

7. The rotating device of claim 2, wherein the tilting rotation assembly further includes a position limitation baffle, and the position limitation baffle is mounted on each of both sides of the arc-shaped rack of the support frame so as to cover the position limitation sawtooth block and the arc-shaped rack.

8. The rotating device of claim 1, further comprising an external housing and a bracket, wherein the external housing is mounted outside the tilting rotation assembly and the horizontal rotation assembly, and the bracket is mounted on the external housing to connect and fixe the external housing and a vehicle dashboard.

9. A vehicle comprising the rotating device of claim 1.

10. A rotating device for a display of a vehicle, the rotating device comprising:

a tilting rotation assembly and a horizontal rotation assembly, wherein the display is fixed to the tilting rotation assembly, the tilting rotation assembly is mounted on the horizontal rotation assembly, and the display is tilted through the tilting rotation assembly and horizontally rotated through the horizontal rotation assembly, wherein the tilting rotation assembly includes a position limitation shaft and a support frame, the position limitation shaft is mounted on the horizontal rotation assembly and extended in a vertical direction, and the support frame is rotatably mounted on the horizontal rotation assembly and the display is fixedly mounted on the support frame, wherein the horizontal rotation assembly includes a steering seat, an upper cover, and a lower cover, and the upper cover and the lower cover are coupled to each other to form one housing, an accommodation space is provided in the housing, the steering seat is disposed in the accommodation space and is enabled to rotate with respect to the housing, and the support frame is rotatably mounted on the steering seat.

11. The rotating device of claim 10, wherein the steering seat includes a bottom plate positioned at a lower portion and a boss positioned on the bottom plate, and the bottom plate and the boss are an integrated structure.

12. The rotating device of claim 11, wherein a circular opening hole is formed in the upper cover, and the boss is circular and is mounted in the circular opening hole.

13. The rotating device of claim 12, wherein a support seat is installed above the boss, the support seat has a support seat hole opened up, and the position limitation shaft is inserted and fixed into the support seat hole.

14. The rotating device of claim 13, wherein two lugs protrude upwards at both sides of the support seat, a hinge shaft hole is horizontally formed in each lug, and the hinge shaft hinges the lower portion of the support frame to the lug through the hinge shaft hole.

15. The rotating device of claim 10, wherein the horizontal rotation assembly further includes a ball assembly, a first concave groove is installed in one of the steering seat and the upper cover, a second concave groove is installed in the other one of the steering seat and the upper cover, and the ball assembly is mounted on the first concave groove.

16. The rotating device of claim 15, wherein a plurality of concave grooves is provided, which is formed along an arc shape around a rotation center at a first predetermined interval, and the number of second concave grooves is larger than the number of first concave grooves, and the second concave grooves are disposed with the same radian as the first concave grooves at a second predetermined interval.

17. The rotating device of claim 15, wherein the ball assembly includes a ball, a spring, and a screw plug, the screw plug is inserted into the first concave groove, the spring is installed at an upper portion of the screw plug, and the ball is mounted on an upper portion of the spring.

18. The rotating device of claim 10, wherein a gear lever is provided in one of the upper cover and the steering seat, and an arc groove is formed in the other one of the upper cover and the steering seat.

* * * * *